United States Patent [19]

College

[11] Patent Number: 5,312,609
[45] Date of Patent: May 17, 1994

[54] METHOD OF SULFUR DIOXIDE REMOVAL FROM GASEOUS STREAMS WITH ALPHA-HEMIHYDRATE GYPSUM PRODUCT FORMATION

[75] Inventor: John W. College, Pittsburgh, Pa.

[73] Assignee: Dravo Lime Company, Pittsburgh, Pa.

[21] Appl. No.: 999,621

[22] Filed: Dec. 31, 1992

[51] Int. Cl.$^5$ ............... C01B 17/00; C01F 11/46
[52] U.S. Cl. ................ 423/243.08; 423/243.09; 423/555
[58] Field of Search .......... 423/243.01, 243.08, 423/243.09, 555

[56] References Cited

U.S. PATENT DOCUMENTS

| | | | |
|---|---|---|---|
| 3,637,347 | 1/1992 | Jonakin et al. | 423/243.08 |
| 3,919,393 | 11/1975 | Selmeczi | 423/242 |
| 3,919,394 | 11/1975 | Selmeczi | 423/242 |
| 4,069,300 | 1/1978 | Akazawa et al. | 423/555 |
| 4,554,140 | 11/1985 | Kudo | 423/243 |
| 4,666,694 | 5/1987 | Jons et al. | 423/555 |
| 4,842,842 | 6/1989 | Kudo | 423/554 |
| 4,976,936 | 12/1990 | Rathi et al. | 423/243.08 |
| 5,015,449 | 5/1991 | Koslowski | 423/172 |
| 5,015,450 | 5/1991 | Koslowski | 423/172 |
| 5,093,093 | 3/1992 | Koslowski | 423/171 |

FOREIGN PATENT DOCUMENTS

| | | |
|---|---|---|
| 0370703 | 5/1990 | European Pat. Off. . |
| 3331838 | 3/1985 | Fed. Rep. of Germany . |
| 3522495 | 1/1987 | Fed. Rep. of Germany . |
| 61-207620 | 9/1986 | Japan ............... 423/243.08 |

OTHER PUBLICATIONS

Autoclave-Free Formation of α-Hemihydrate Gypsum A. Zurz et al., J. Am. Ceram. Soc. 74(5) 1117-24 (1991).

Primary Examiner—Gregory A. Heller
Attorney, Agent, or Firm—Armstrong, Westerman, Hattori, McLeland & Naughton

[57] ABSTRACT

A method is provided for removing sulfur dioxide from a hot gaseous stream while directly producing α-hemihydrate gypsum from a scrubber effluent. A portion of an aqueous scrubbing medium containing calcium and magnesium sulfite is removed from a scrubbing unit and passed to a pressurized oxidation vessel where the sulfites are contacted with an oxidizing gas at an elevated temperature to convert calcium sulfite directly to α-hemihydrate gypsum and magnesium sulfite to magnesium sulfate. The α-hemihydrate is separated from the aqueous medium removed from the pressurized oxidation vessel.

12 Claims, 1 Drawing Sheet

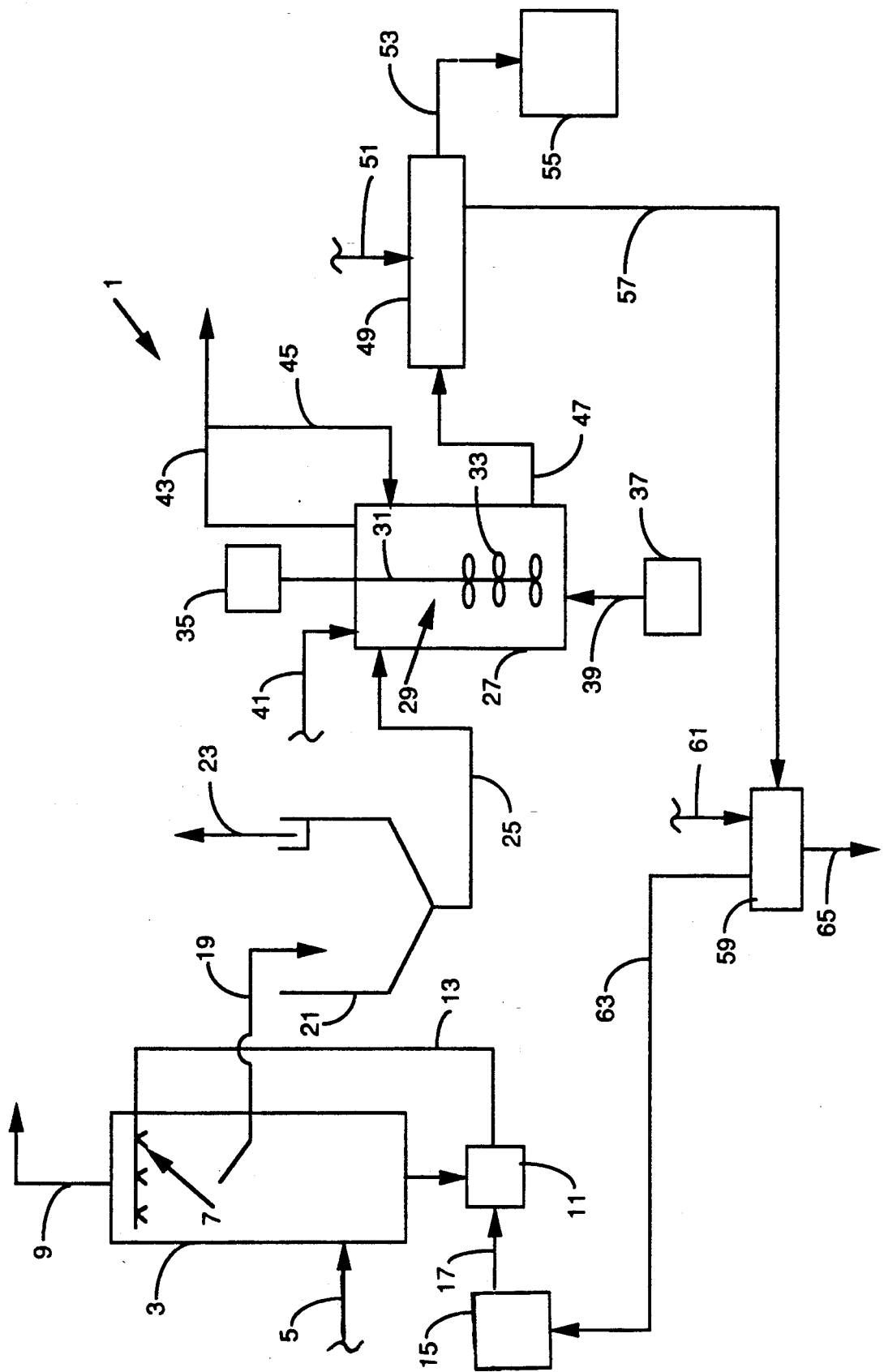

METHOD OF SULFUR DIOXIDE REMOVAL FROM GASEOUS STREAMS WITH ALPHA-HEMIHYDRATE GYPSUM PRODUCT FORMATION

FIELD OF THE INVENTION

The present invention provides a method of removing sulfur dioxide from hot flue gas streams while directly producing α-hemihydrate gypsum as a by-product of the method.

BACKGROUND OF THE INVENTION

The use of wet scrubbing processes for removing sulfur dioxide from hot flue gases has become a primary means for cleaning stack gases from power plants or other coal combusting units. Such processes usually use an aqueous lime or limestone slurry which is passed downwardly through a wet scrubbing unit to react with, and remove sulfur dioxide from, hot gases passing upwardly through the wet scrubbing unit. Especially favorable results have been commercially achieved by using aqueous lime slurries that are enriched with a magnesium component such as magnesium oxide or magnesium hydroxide, such as disclosed in U.S. Pat. Nos. 3,919,393 and 3,919,394, the contents of both patents incorporated by reference herein.

In scrubbing of hot sulfur dioxide-containing gases by magnesium enhanced lime scrubbing processes, calcium sulfite is formed which must be removed from the scrubbing system through use of a bleed stream from the recycling aqueous scrubbing medium. This bleed stream will also contain minor amounts of magnesium sulfite and chlorides. The bleed stream is normally passed to a thickener or separator where a resultant thickened sludge, or underflow, is separated and removed from the system while clarified aqueous media, or overflow, is normally returned to the aqueous scrubbing slurry in the wet scrubbing unit. The sludge removed from the wet scrubbing system contains primarily calcium sulfites and magnesium sulfites, along with various chloride salts and other impurities. The calcium sulfite sludges are difficult to dewater due to their physical properties and, when deposited into settling ponds or collection areas, require a large area and a period of time before solidification occurs.

One procedure for reducing the amount of sludge produced and discarded has been to oxidize the calcium sulfite-containing sludge so as to convert the calcium sulfite to calcium sulfate which is more easily dewatered and thus provides less volume of sludge that must be handled and used as landfill. Also, when calcium sulfate is produced as gypsum, or calcium sulfate dehydrate ($CaSO_4 \cdot 2H_2O$), the gypsum can, at times, be used in various products such as industrial and building plasters, such as gypsum wallboard. The demand for gypsum is not, however, sufficiently high to absorb all of the gypsum produced by various commercial processes as well as that which would be produced if all sulfur dioxide lime scrubbing sludges were converted to gypsum. In addition, magnesium present in gypsum can have an adverse affect on the gypsum performance in conventional usage.

An especially useful form of gypsum, α-hemihydrate gypsum, or calcium sulfate α-hemihydrate ($\alpha CaSO_4 \cdot \frac{1}{2} H_2O$) which is not normally formed in sulfur dioxide removal aqueous sludges, has specific uses which provide value over and above conventional gypsum or calcium sulfate dehydrate. The production of α-hemihydrate gypsum is generally effected by heating natural or by-product gypsum in an autoclave at elevated temperatures of above 100° C. and superatmospheric pressure. The production of α-hemihydrate gypsum from gypsum obtained from power plant flue gas desulfurization processes has been proposed, for example, in U.S. Pat. Nos. 5,015,449 and 5,015,450, where moist fine grained gypsum is molded into a body and the molded body fed to an autoclave where it is subjected to a temperature in the range of 110° C. to 180° C. under pressure.

When gypsum (calcium sulfate dehydrate) is converted to α-hemihydrate gypsum, energy is required to drive off the excess water and provision of such energy is costly to the process.

In U.S. Pat. No. 4,069,300, a process is described for producing α-type hemihydrate calcium sulfate by oxidizing calcium sulfite in a suspension that contains at least one anionic, nonionic or amphoteric surface active agent. That process suggests that the calcium sulfite suspension used could be one produced by absorbing a waste gas containing $SO_2$ with a slaked lime slurry. In that process, temperatures as low as 90° C. are used, and no autoclave is used meaning that the process is not carried out under superatmospheric pressure, which is said to result in coarser crystals. The suspension must contain seed crystals of α-type hemihydrate of calcium sulfate which are added in an amount of between about 10 to 150 times the weight of the surface active agent used.

It is an object of the present invention to provide a method for the removal of sulfur dioxide from a hot gas stream, using an aqueous scrubbing medium containing calcium and magnesium scrubbing components and continuously produce α-hemihydrate gypsum from the scrubber effluent.

It is another object of the present invention to provide a method for the removal of sulfur dioxide from a hot gas stream, using an aqueous scrubbing medium containing calcium and magnesium scrubbing components and continuously produce α-hemihydrate gypsum from the scrubber effluent at exceptionally high conversion rates while removing magnesium sulfate therefrom.

It is yet another object of the present invention to provide a method for removal of sulfur dioxide from a hot gas stream using an aqueous scrubbing medium containing calcium and magnesium scrubbing components and continuously produce α-hemihydrate gypsum from the scrubber effluent in an energy efficient manner.

It is a further object of the present invention to provide a method for removal of sulfur dioxide from a hot gas stream using an aqueous scrubbing medium containing calcium and magnesium compounds and continuously produce α-hemihydrate gypsum while using the exothermic energy of calcium sulfite oxidation to produce heat and a portion of the pressure required to form α-hemihydrate gypsum.

SUMMARY OF THE INVENTION

Sulfur dioxide is removed from a sulfur dioxide-containing gaseous stream, such as a flue gas stream from a coal combustion power plant, by contacting the sulfur dioxide-containing gaseous stream with an aqueous scrubbing medium containing calcium components and magnesium components, such as lime and magnesium hydroxide, with the sulfur dioxide converted to calcium and magnesium sulfites in the aqueous medium. A portion of the aqueous medium containing calcium sulfite and magnesium sulfite is continuously removed from the scrubbing unit and passed to a pressurized oxidation vessel. In the pressurized oxidation vessel, the aqueous medium containing calcium sulfite and magnesium sulfite, and preferably magnesium bisulfite, is contacted with an oxidizing gas, such as air or oxygen, under superatmospheric pressure and at elevated temperature of between 100–145° C., with the calcium sulfite directly converted to $\alpha$-hemihydrate gypsum and the magnesium sulfite converted to magnesium sulfate. The $\alpha$-hemihydrate precipitates from the aqueous medium while the magnesium sulfate dissolves in the aqueous medium. The aqueous medium, which now contains precipitated $\alpha$-hemihydrate gypsum and dissolved magnesium sulfate is continuously removed from the pressurized oxidation vessel and the $\alpha$-hemihydrate gypsum separated therefrom, such as by filtration. Crystal modifiers may be added to the aqueous medium to enhance certain properties of the $\alpha$-hemihydrate gypsum product.

Magnesium sulfate contained in the aqueous medium removed from the pressurized oxidation vessel may be converted to magnesium hydroxide and either returned to the scrubbing unit as a magnesium scrubbing component or used elsewhere or sold as a by-product. Vapors released from the pressurized oxidation vessel, primarily steam, may be used as a heat source in the process and condensed and returned to the scrubbing unit or used elsewhere in the method.

BRIEF DESCRIPTION OF THE DRAWING

The present invention will become more readily apparent from the following description and the accompanying drawing which is a schematic illustration of a preferred embodiment of the method of sulfur dioxide removal from a hot gaseous stream with $\alpha$-hemihydrate gypsum formation.

DETAILED DESCRIPTION

According to the present method, sulfur dioxide gases may be removed from a hot gaseous stream, while concomitantly producing $\alpha$-hemihydrate gypsum as a saleable product.

In the process, a hot gaseous stream containing sulfur dioxide is contacted in a wet scrubber with an aqueous medium containing calcium and magnesium scrubbing components. A preferred aqueous medium containing calcium and magnesium components is one such as described in U.S. Pat. Nos. 3,919,393 and 3,919,394, referred to hereinbefore. In the processes described therein, the addition of a specified amount of magnesium components is made to a lime slurry which results in an increased removal of sulfur dioxide. As described therein, a calcium oxide aqueous slurry containing a specified amount, such as between 250 to 5000 parts per million (ppm), of magnesium ions is used as the aqueous scrubbing medium in a wet scrubbing unit.

A portion of the aqueous scrubbing medium is removed from the wet scrubber so as to prevent build-up of excess solids. The portion of aqueous medium removed is preferably taken from a location in the scrubbing unit, such as at a downcomer, prior to passage to a hold tank. This provides the portion of aqueous medium at a somewhat lower pH, such as about 5.5, rather than at a value of about 6.5 that results from passage of the aqueous scrubbing medium to a hold tank and recycle back to the scrubbing unit. The portion of aqueous scrubbing medium, which contains primarily calcium sulfite, magnesium sulfite, and preferably magnesium bisulfite, is passed to a thickener where a concentrated aqueous medium or thickener underflow is separated from a clarified aqueous medium or thickener overflow. The thickener overflow which has primarily dissolved components may be recycled to the wet scrubber.

The thickener underflow, an aqueous medium containing calcium sulfite and magnesium sulfite, generally in an amount of between 5–35 percent by weight, and usually about 20–25 percent by weight, is passed to a pressurized oxidation vessel and is contacted with an oxidizing gas, such as air or oxygen, at elevated temperatures and under superatmospheric pressure to form $\alpha$-hemihydrate gypsum and magnesium sulfate.

The oxidation is carried out at an elevated temperature of between 100–145° C. (212–293° F.). The use of temperatures below about 100° C. will not provide a sufficient rate of oxidation, while the use of temperatures in excess of 145° C., while usable, will waste energy and provide an inefficient process.

During the oxidation, the pressure within the pressurized oxidation vessel should be maintained between 20 to 60 pounds per square inch, and preferably between 30–50 pounds per square inch. Pressures less than about 30 pounds per square inch will provide poor oxidation and an unacceptable slow rate of oxidation, while pressures in excess of about 50 pounds per square inch do not provide compensating benefits and would require more specialized equipment.

The pH of the aqueous medium in the pressurized oxidation vessel, during oxidation of the calcium sulfite to $\alpha$-hemihydrate gypsum and the magnesium sulfite to magnesium sulfate, should be maintained between 2.5 to 5.5 and preferably in a range of 3–4. A pH of less than about 2.5 should be avoided since excess acid would be required over that necessary and could cause corrosion problems in the equipment, while a pH in excess of about 5.5 results in a slow rate of oxidation and poor conversion.

It has been found that the presence of magnesium ions, such as in the form of magnesium bisulfite and magnesium sulfite which are converted to magnesium sulfate during the oxidation of calcium sulfite to $\alpha$-hemihydrate gypsum, has a beneficial affect on the conversion. The magnesium ion content of the portion of aqueous medium fed to the pressurized oxidation vessel should be between about 250–8000 ppm, and preferably between about 500–5000 ppm. Also, the presence of magnesium bisulfite in the aqueous scrubbing medium removed from the downcomer of the scrubbing unit provides an acidic component to lower the pH during the oxidation. The magnesium bisulfite is oxidized to magnesium sulfate while producing sulfuric acid that aids in controlling the pH of the aqueous medium in the pressurized oxidation vessel within the desired acidic range.

An advantage provided by the present method is that the oxidation of calcium sulfite to $\alpha$-hemihydrate gypsum is an exothermic reaction. Thus, once the oxidation reaction has been initiated, the elevated temperature required to produce $\alpha$-hemihydrate gypsum is maintained by the exothermic reaction. This is a distinct advantage over processes that produce $\alpha$-hemihydrate gypsum from calcium sulfate, since those processes require a continuous supply of heat energy to effect the conversion, which is not exothermic. In addition, the exotherm provided by the present method in a sealed oxidation vessel also provides a portion of the pressure needed to maintain the conversion to α-hemihydrate gypsum.

Crystal modifiers, such as succinic acid or potassium sulfate, or mixtures thereof, may be added to the aqueous medium in the pressurized oxidation vessel to enhance the crystal structure of the α-hemihydrate gypsum produced.

An embodiment of the present invention will now be explained with reference to the drawing. In the drawing, a desulfurization facility for the removal of sulfur dioxide from a hot gaseous stream with concomitant production of α-hemihydrate gypsum is designated by the numeral 1. A hot gaseous stream containing sulfur dioxide is introduced into a wet scrubbing unit 3 through line 5, such as a flue gas stream from a coal combustion device of a power plant. The hot gaseous stream passes upwardly through the scrubbing unit 3 and is contacted therein by an aqueous scrubbing medium containing calcium scrubbing components and magnesium scrubbing components introduced through sprayers 7, the cleaned gas being discharged from the wet scrubbing unit 3 through outlet 9 to the atmosphere. The aqueous scrubbing medium, after contact with the sulfur dioxide contains calcium sulfite and magnesium sulfite and is normally passed to a hold tank 11. From the hold tank 11, aqueous scrubbing medium is recycled through line 13 back to the sprayers 7 for further contact with the sulfur dioxide-containing gaseous stream, while fresh aqueous scrubbing medium containing calcium scrubbing components and magnesium scrubbing components may be added from a source 15 through line 17 to the hold tank 11. In order to remove solids from the scrubbing system, a portion of the aqueous scrubbing medium, or bleed stream, which contains calcium sulfite and magnesium sulfite solids, is removed, preferably from a downcomer in the wet scrubbing unit 3, through line 19 and fed to a thickener 21, in the nature of a clarifying unit, wherein concentrated solids will collect at the bottom while clarified liquor rises to the top. The clarified liquor or thickener overflow is removed from the thickener 21 through line 23 and may be returned for use in the wet scrubbing unit 3, while the thickened slurry, or underflow, containing calcium sulfite and magnesium sulfite is removed from the thickener 21 by means of line 25.

The thickener underflow, as aqueous medium containing calcium sulfite and magnesium sulfite, is passed through line 25, from the thickener 21 to a pressurized oxidation vessel 27 and continuously passed therethrough. In the pressurized oxidation vessel, the aqueous medium is agitated, such as by the use of an agitation device 29, such as a multi-bladed stirrer comprising a shaft 31 and blades 33, driven by a motor 35.

An oxidizing gas is introduced into the aqueous scrubbing medium containing calcium sulfite and magnesium sulfite, from a source 37, through line 39 and contacts the aqueous scrubbing medium being agitated by the agitation device 29, while under superatmospheric pressure, at an elevated temperature, such that the calcium sulfite contained in the aqueous medium is converted to α-hemihydrate gypsum and precipitates while the magnesium sulfite contained in the aqueous medium is converted to magnesium sulfate which is dissolved in the aqueous medium and forms an aqueous solution. Acid, as desired or required, to maintain the proper pH of the aqueous medium in the oxidation vessel 27 may be provided thereto through line 41. Because of the exothermic reaction caused by oxidation of the components in the aqueous medium, in order to maintain the proper temperature and pressure within the oxidation vessel 27, vapors, primarily steam, may be released through exhaust line 43 and, if desired, a portion of such vapors, after condensation, may be returned to oxidation vessel 27 through line 45.

After oxidation, the aqueous medium containing α-hemihydrate solids and dissolved magnesium sulfate is continuously removed from the oxidation vessel 27 through line 47 and passed to a separator 49, such as a filter, where the α-hemihydrate gypsum is separated from the aqueous medium containing dissolved magnesium sulfate. Water, through line 51, may be supplied to wash the α-hemihydrate gypsum which is then discharged through line 53 to a storage bin 55. The aqueous medium containing dissolved magnesium sulfate is passed from the separator 49 through line 57. The separated aqueous medium containing magnesium sulfate may be fed to a regenerator 59 where lime is added through line 61 to produce magnesium hydroxide that may be returned to the scrubbing system, such as to the source of scrubbing components 15 through line 63, while gypsum produced in the regenerator 59 is discharged through line 65.

As an example of the present method, a simulated aqueous medium from a magnesium-enhanced lime scrubbing process was provided in a diluted state containing about 7.5 percent solids by weight. A conventional such aqueous medium would contain about 20–30 percent solids, primarily calcium sulfite. The aqueous medium contained about 75,000 mg/l calcium sulfite and 5000 mg/l magnesium sulfite. In a series of runs, aqueous medium was fed to a pressurized oxidation vessel and oxygen sparged through the aqueous medium, which was heated to the temperature listed in the following Table. The pressure used and pH (adjusted by addition of sulfuric acid) of the aqueous medium were varied as shown in the Table, as was the flow rate of the oxygen. The aqueous medium in the pressurized oxidation vessel was heated to 100° C. and then the exotherm of the reaction used to maintain the temperature indicated.

TABLE

| Run No. | Pressure | pH | $O_2$ Flow Rate (l/min.) | Temp. (°C.) | Sulfite Concentration in Product (Wt. % as $SO_2$) | Percent Conversion to α-hemihydrate |
|---|---|---|---|---|---|---|
| 1 | 55 | 3.1 | 11 | 127 | 0.21 | 99.52 |
| 2 | 60 | 2.2 | 11 | 127 | 0.26 | 99.41 |
| 3 | 80 | 3.1 | 11 | 127 | 0.05 | 99.89 |
| 4 | 60 | 3.8 | 11 | 127 | 0.64 | 98.55 |
| 5 | 60 | 5.1 | 10 | 124 | 8.74 | 80.14 |
| 6[1] | 40 | 3.2 | 11 | 118 | 0.96 | 97.82 |
| 7 | 40 | 4.1 | 10 | 118 | 0.46 | 98.96 |
| 8 | 60 | 4 | 11 | 127 | 0.33 | 99.25 |
| 9 | 30 | 3 | 10 | 116 | 0.36 | 99.20 |
| 10 | 30 | 4 | 10 | 116 | 6.02 | 86.32 |
| 11 | 20 | 3.1 | 11 | 110 | 17.64 | 59.91 |
| 12 | 20 | 4 | 10 | 117 | 14.47 | 67.12 |
| 13 | 17 | 3.1 | 13 | 117 | 16.8 | 61.82 |
| 14 | 16 | 4.1 | 11 | 104 | 21.2 | 52.05 |
| 15[2] | 67 | 3 | 11 | 130 | 7.39 | 83.21 |
| 16[3] | 60 | 3 | 20 | 127 | 5.65 | 87.16 |
| 17 | 60 | 4 | 11 | 110 | 0.23 | 99.48 |

[1] Solids content = 15 percent
[2] Air used instead of oxygen
[3] No magnesium ions present As can be seen by the results, the present invention provides a method for forming α-hemihydrate gypsum while removing sulfur dioxide from a sulfur dioxide-containing hot gaseous stream with the presence of magnesium components in a calcium component aqueous scrubbing medium enhancing such formation.

What is claimed is:

1. A method of removing sulfur dioxide from a sulfur dioxide-containing hot gaseous stream and producing α-hemidydrate gypsum, comprising:

contacting said sulfur dioxide-containing hot gaseous stream with an aqueous scrubbing medium containing calcium and magnesium scrubbing components in a scrubbing unit, wherein said sulfur dioxide is converted to calcium and magnesium sulfites in an aqueous medium;

continuously removing at least a portion of said aqueous medium containing calcium sulfite and magnesium sulfite from said scrubbing unit;

continuously passing at least a portion of said removed aqueous medium containing calcium sulfite and magnesium sulfite, having a solids content of between about 5-35 percent by weight, to a pressurized oxidation vessel;

contacting said aqueous medium containing calcium sulfite and magnesium sulfite in said pressurized oxidation vessel with an oxidizing gas at an elevated temperature and super-atmospheric pressure to convert said calcium sulfite to α-hemihydrate gypsum, which precipitates from said aqueous medium, and said magnesium sulfite to magnesium sulfate, which dissolves in said aqueous medium, with heat of reaction resulting from said conversion used to maintain said elevated temperature and provide a portion of the pressure within said pressurized oxidation vessel, and the presence of magnesium ions from said magnesium sulfite and magnesium sulfate enhancing said conversion of calcium sulfite to α-hemihydrate gypsum;

continuously removing aqueous medium containing precipitated α-hemihydrate gypsum and dissolved magnesium sulfate from said pressurized oxidation vessel; and separating said α-hemihydrate gypsum from said aqueous medium.

2. A method of removing sulfur dioxide from a sulfur dioxide-containing hot gaseous stream and producing α-hemihydrate gypsum as defined in claim 1 wherein said elevated temperature is maintained at between about 100–145° C.

3. The method of removing sulfur dioxide from a sulfur dioxide-containing hot gaseous stream and providing α-hemihydrate gypsum as defined in claim 2 wherein an initial portion of said aqueous medium containing calcium sulfite and magnesium in said pressurized oxidation vessel is heated to about 100° C.

4. The method of removing sulfur dioxide from a sulfur dioxide-containing hot gaseous stream and providing α-hemihydrate gypsum as defined in claim 1 wherein said superatmospheric pressure is maintained at between about 20–60 pounds per square inch.

5. The method of removing sulfur dioxide from a sulfur dioxide-containing hot gaseous stream and providing α-hemihydrate gypsum as defined in claim 1 wherein the pH of said aqueous slurry in said pressurized oxidation vessel is maintained at between 2.5–5.5.

6. The method of removing sulfur dioxide from a sulfur dioxide-containing hot gaseous stream and providing α-hemihydrate gypsum as defined in claim 1 wherein said oxidizing gas is oxygen.

7. The method of removing sulfur dioxide from a sulfur dioxide-containing hot gaseous stream and providing α-hemihydrate gypsum as defined in claim 1 wherein said oxidizing gas is air.

8. The method of removing sulfur dioxide from a sulfur dioxide-containing hot gaseous stream and providing α-hemihydrate gypsum as defined in claim 1 said aqueous medium passed to said pressurized oxidation vessel contains about 5 to 35 percent by weight combined calcium sulfites and magnesium sulfites.

9. A method of removing sulfur dioxide from a sulfur dioxide-containing hot gaseous stream and producing α-hemihydrate gypsum, comprising:

contacting said sulfur dioxide-containing hot gaseous stream with an aqueous scrubbing medium containing calcium and magnesium scrubbing components in a scrubbing unit, wherein said sulfur dioxide is converted to calcium and magnesium sulfites in an aqueous medium;

continuously removing at least a portion of said aqueous medium containing calcium sulfite and magnesium sulfite, having solids content of between about 5–35 percent by weight, from said scrubbing unit;

continuously passing at least a portion of said removed aqueous medium containing calcium sulfite and magnesium sulfite to a pressurized oxidation vessel;

contacting said aqueous medium containing calcium sulfite and magnesium sulfite in said pressurized oxidation vessel with an oxidizing gas at an elevated temperature of between about and 100–145° C. and superatmospheric pressure of between about 20–60 pounds per square inch, while maintaining the pH of said aqueous medium at between 2.5–5.5, to convert said calcium sulfite to α-hemihydrate gypsum, which precipitates from said aqueous medium, and said magnesium sulfite to magnesium sulfate, which dissolves in said aqueous medium, with heat of reaction resulting from said conversion used to maintain said elevated temperature and provide a portion of the pressure within said pressurized oxidation vessel, and the presence of magnesium ions from said magnesium sulfite and magnesium sulfate enhancing said conversion of calcium sulfite to α-hemihydrate gypsum;

continuously removing aqueous medium containing precipitated α-hemihydrate gypsum and dissolved magnesium sulfate from said pressurized oxidation vessel; and separating said α-hemihydrate gypsum from said aqueous medium.

10. The method of removing sulfur dioxide from a sulfur dioxide-containing hot gaseous stream and providing α-hemihydrate gypsum as defined in claim 9 wherein said oxidizing gas is oxygen.

11. The method of removing sulfur dioxide from a sulfur dioxide-containing hot gaseous stream and providing α-hemihydrate gypsum as defined in claim 9 wherein said oxidizing gas is air.

12. The method of removing sulfur dioxide from a sulfur dioxide-containing hot gaseous stream and providing α-hemihydrate gypsum as defined in claim 9 wherein an initial portion of said aqueous medium containing calcium sulfite and magnesium in said pressurized oxidation vessel is heated to about 100° C.

* * * * *